(12) United States Patent
Stewart et al.

(10) Patent No.: US 6,675,433 B1
(45) Date of Patent: Jan. 13, 2004

(54) BEAM BLADE WIPER ASSEMBLY HAVING IMPROVED WIND LIFT CHARACTERISTICS

(75) Inventors: Jeffrey Stewart, Lake Orion, MI (US); William Young, III, Farmington Hills, MI (US)

(73) Assignee: TRICO Products Corporation, Rochester, MI (US)

( * ) Notice: Subject to any disclaimer, the term of this patent is extended or adjusted under 35 U.S.C. 154(b) by 552 days.

(21) Appl. No.: 09/610,499

(22) Filed: Jul. 6, 2000

(51) Int. Cl.[7] .................................................. B60S 1/38
(52) U.S. Cl. .............................. 15/250.43; 15/250.451; 15/250.361
(58) Field of Search ........................ 15/250.43, 250.44, 15/250.451, 250.452, 250.453, 250.48, 250.002, 250.361, 250.41, 250.201

(56) References Cited

U.S. PATENT DOCUMENTS

| | | | |
|---|---|---|---|
| 2,589,339 A | 3/1952 | Carson ........................ 15/245 |
| 2,799,887 A | 7/1957 | Nemic .......................... 15/255 |
| 2,801,436 A | 8/1957 | Scinta .......................... 15/245 |
| 2,814,820 A | 12/1957 | Elliott et al. ................... 15/245 |
| 2,937,393 A | 5/1960 | Brueder ........................ 15/245 |
| 3,029,460 A | 4/1962 | Hoyler |
| 3,037,233 A | 6/1962 | Peras et al. ............... 15/250.42 |
| 3,056,991 A | 10/1962 | Smithers .................. 15/250.41 |
| 3,082,464 A | 3/1963 | Smithers .................. 15/250.42 |
| 3,088,155 A | 5/1963 | Smithers .................. 15/250.42 |
| 3,089,174 A | 5/1963 | Bignon ..................... 15/250.36 |
| 3,104,412 A | 9/1963 | Hinder ..................... 15/250.42 |
| 3,132,367 A | 5/1964 | Wise ........................ 15/250.42 |
| 3,192,551 A | 7/1965 | Appel ...................... 15/250.36 |
| 3,234,578 A | 2/1966 | Golub et al. ............. 15/250.42 |
| 3,296,647 A | 1/1967 | Gumbleton .............. 15/250.04 |
| 3,317,946 A | 5/1967 | Anderson ................. 15/250.42 |
| 3,350,738 A | 11/1967 | Anderson ................. 15/250.42 |
| D211,570 S | 7/1968 | Tomlin .......................... D14/6 |
| 3,418,679 A | 12/1968 | Barth et al. .............. 15/250.36 |
| 3,480,986 A | 12/1969 | Forster ..................... 15/250.36 |
| 3,588,942 A | 6/1971 | Schlesinger .............. 15/250.32 |
| 3,618,155 A | 11/1971 | Mower ..................... 15/250.42 |
| 3,665,544 A | 5/1972 | Sakamoto ................. 15/250.42 |

(List continued on next page.)

FOREIGN PATENT DOCUMENTS

| | | |
|---|---|---|
| DE | 1 247 161 | 8/1967 |
| DE | 2 311 293 | 9/1974 |
| DE | 23 36 271 | 2/1975 |
| DE | 23 50 302 | 4/1975 |
| DE | 23 53 368 | 5/1975 |
| DE | 197 34 843 A1 | 2/1999 |
| DE | 198 14 609 A1 | 10/1999 |
| EP | 0 594 451 A1 | 10/1993 |
| FR | 2515121 | 7/1982 |
| GB | 1 012 902 | 12/1965 |
| GB | 1 395 918 | 5/1975 |
| GB | 2 308 542 A | 7/1997 |
| WO | WO 00/21809 | 4/2000 |

*Primary Examiner*—Gary K. Graham
(74) *Attorney, Agent, or Firm*—Bliss McGlynn, P.C.

(57) ABSTRACT

A beam blade windshield wiper assembly having an elongated backbone defining a median line extending along its longitudinal beam length between its first and second ends. The backbone includes an upper surface and a lower mounting surface as well as first and second sides extending between the upper and lower surfaces and the first and second longitudinal ends. The first side of the backbone defines a leading edge and the second side of the backbone defines a trailing edge thereof. The assembly also includes a wiper element having a longitudinal centerline, said wiper element mounted to said backbone such that its longitudinal centerline is offset from said median line of said backbone in the direction of said leading edge.

13 Claims, 3 Drawing Sheets

U.S. PATENT DOCUMENTS

| | | | |
|---|---|---|---|
| 3,673,631 A | 7/1972 | Yamadai et al. | 15/250.42 |
| 3,685,086 A | 8/1972 | Froehlich | 15/250.2 |
| 3,751,754 A | 8/1973 | Quinian et al. | 15/250.32 |
| 3,780,395 A | 12/1973 | Quinian et al. | 15/250.36 |
| 3,862,465 A | 1/1975 | Ito | 15/250.42 |
| 3,872,537 A | 3/1975 | Bianchi | 15/250.42 |
| 3,879,793 A | 4/1975 | Schlegel | 15/250.42 |
| 3,881,214 A | 5/1975 | Palu | 15/250.42 |
| 4,028,770 A | 6/1977 | Appel | 15/250.42 |
| 4,063,328 A | 12/1977 | Arman | 15/250.42 |
| 4,102,003 A | 7/1978 | Hancu | 15/250.42 |
| 4,127,916 A | 12/1978 | van den Berg et al. | 15/250.42 |
| 4,309,790 A | 1/1982 | Bauer et al. | 15/250.42 |
| 4,339,839 A | 7/1982 | Knights | 15/250.04 |
| 4,343,063 A | 8/1982 | Batt | 15/250.42 |
| D267,939 S | 2/1983 | Duvoux | D12/155 |
| D268,020 S | 2/1983 | Duvoux | D12/155 |
| 4,400,845 A | 8/1983 | Noguchi et al. | 15/250.42 |
| 4,422,207 A | 12/1983 | Maiocco et al. | 15/250.42 |
| 4,438,543 A | 3/1984 | Noguchi et al. | 15/250.42 |
| 4,464,808 A | 8/1984 | Berry | 15/250.2 |
| 4,547,925 A | 10/1985 | Blackborow et al. | 15/250.42 |
| 4,561,143 A | 12/1985 | Beneteau | 15/250.42 |
| 4,570,284 A | 2/1986 | Verton | 15/250.42 |
| 4,587,686 A | 5/1986 | Thompson | 15/250.42 |
| 4,590,638 A | 5/1986 | Beneteau | 15/250.42 |
| 4,741,071 A | 5/1988 | Bauer et al. | 15/250.42 |
| 4,766,636 A | 8/1988 | Shinpo | 15/250.42 |
| 4,782,547 A | 11/1988 | Mohnach | 15/250.04 |
| 4,807,326 A | 2/1989 | Arai et al. | 15/250.42 |
| 4,852,206 A | 8/1989 | Fisher | 15/250.42 |
| D307,408 S | 4/1990 | Mower et al. | D12/155 |
| D308,660 S | 6/1990 | Fisher | D12/155 |
| D308,845 S | 6/1990 | Charet et al. | D12/155 |
| 4,976,001 A | 12/1990 | Wright | 15/250.2 |
| 4,984,325 A | 1/1991 | Arai et al. | 15/250.2 |
| 4,989,290 A | 2/1991 | Hoshino | 15/250.42 |
| 5,042,106 A | 8/1991 | Maubray | 15/250.2 |
| 5,056,183 A * | 10/1991 | Haney | 15/250.48 |
| 5,062,176 A | 11/1991 | Unterborn et al. | 15/250.23 |
| 5,086,534 A | 2/1992 | Journee | 15/250.2 |
| 5,093,954 A | 3/1992 | Kuzuno | 15/250.42 |
| 5,123,140 A | 6/1992 | Raymond | 15/250.42 |
| 5,138,739 A | 8/1992 | Maubray | 15/250.42 |
| 5,168,596 A | 12/1992 | Maubray | 15/250.2 |
| 5,170,527 A | 12/1992 | Lyon, II | 15/250.42 |
| 5,179,761 A | 1/1993 | Buechele et al. | 15/250.42 |
| 5,206,969 A | 5/1993 | Patterson et al. | 15/250.42 |
| 5,218,735 A | 6/1993 | Maubray | 15/250.42 |
| 5,228,167 A | 7/1993 | Yang | 15/250.39 |
| 5,233,721 A | 8/1993 | Yang | 15/250.39 |
| 5,257,436 A | 11/1993 | Yang | 15/250.4 |
| 5,276,937 A | 1/1994 | Lan | 15/257.01 |
| 5,283,925 A | 2/1994 | Maubray | 15/250.2 |
| 5,307,536 A | 5/1994 | Lescher | 15/250.42 |
| 5,311,636 A | 5/1994 | Lee | 15/250.42 |
| 5,319,826 A | 6/1994 | Mower | 15/250.42 |
| 5,325,564 A | 7/1994 | Swanepoel | 15/250.42 |
| 5,383,249 A | 1/1995 | Yang | 15/250.42 |
| 5,392,489 A | 2/1995 | Mohnach | 15/250.42 |
| 5,454,135 A | 10/1995 | Okuya et al. | 15/250.42 |
| 5,463,790 A | 11/1995 | Chiou et al. | 15/250.29 |
| 5,485,650 A | 1/1996 | Swanepoel | 15/250.43 |
| 5,509,166 A | 4/1996 | Wagner et al. | 15/250.44 |
| 6,279,191 B1 * | 8/2001 | Kotlarski et al. | 15/250.201 |

* cited by examiner

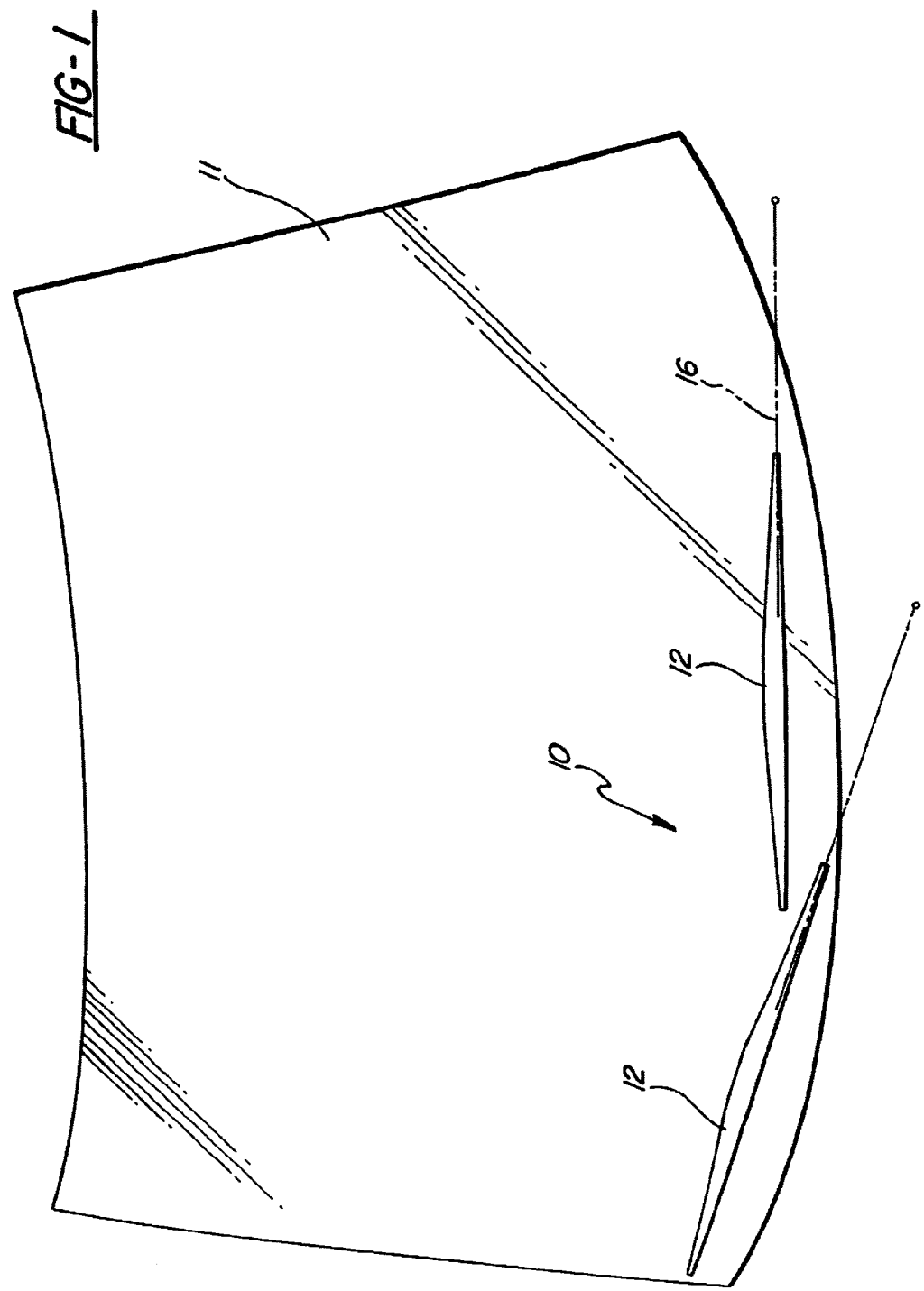

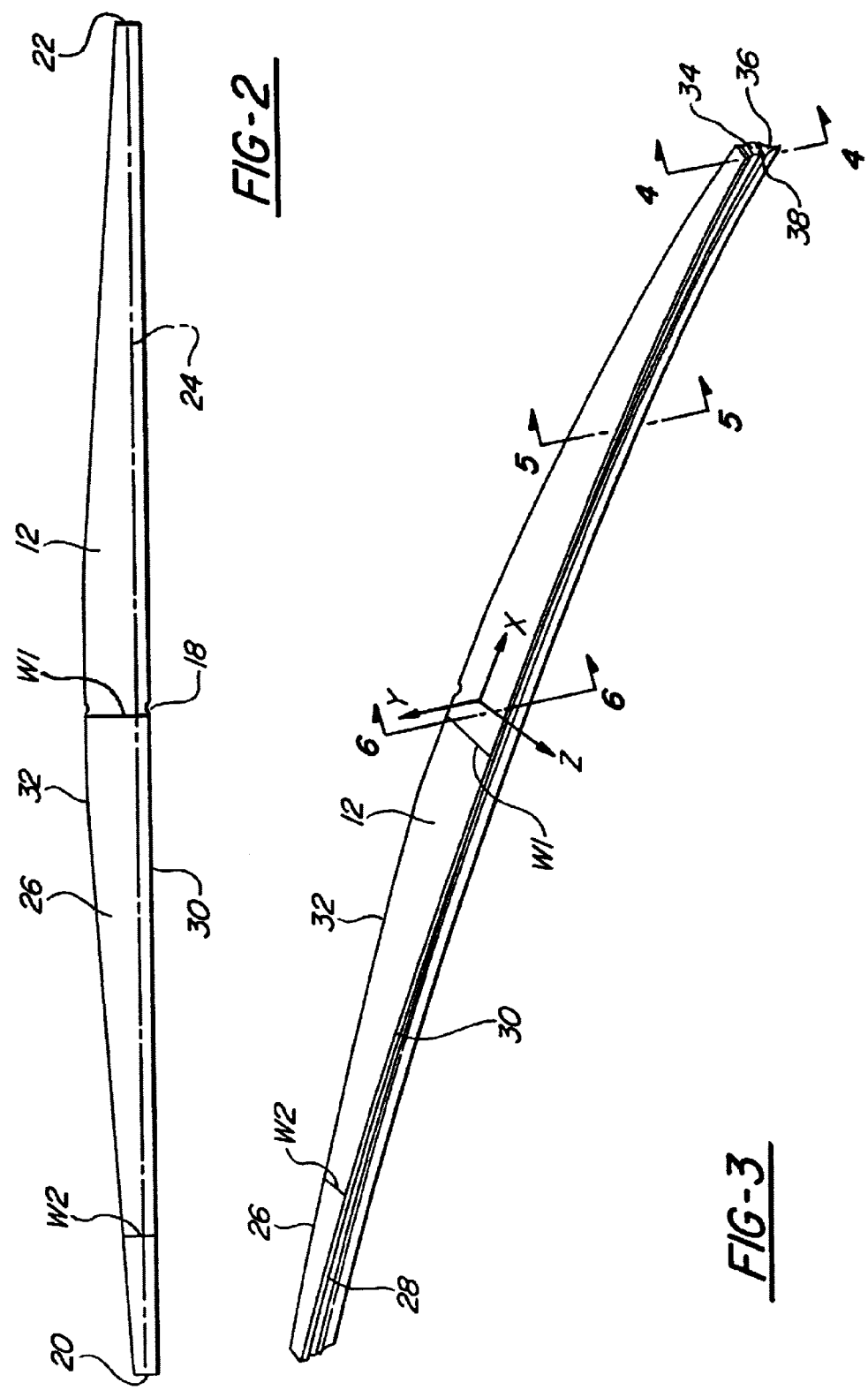

BEAM BLADE WIPER ASSEMBLY HAVING IMPROVED WIND LIFT CHARACTERISTICS

BACKGROUND OF THE INVENTION

1. Field of the Invention

The present invention relates, generally, to a windshield wiper assembly and, more specifically to a beam blade wiper assembly having improved wind lift characteristics.

2. Description of the Related Art

Air foils have long been used in connection with wiper blades. At higher vehicular driving speeds, the wiper blade assemblies are subject to forces which can cause the blade assemblies to lift from the windshield of the vehicle. This phenomenon is sometimes referred to as "wind lift." Wind lift can result in a decrease in the effectiveness of the wiper blade assembly to clean the windshield. Under certain circumstances, such as heavy rain, sleet or snow, wind lift can have a serious effect on traffic safety. Thus, for many years, air foils of various designs have been employed to combat the wind lift problem.

Generally speaking, air foils generate a pressure that forces the wiper blade assembly into contact with the windshield most notably at elevated driving speeds where wind lift can be extreme. An air foil is usually carried by the wiper blade assembly and functions to combat wind lift by creating a positive pressure forcing the wiper blade into engagement with the windshield at elevated and even conventional vehicular speeds. The air foil usually includes a gently curved foil which is outwardly concave relative to the wiper blade assembly and which faces the general direction of the movement of the vehicle. The foil extends axially along a substantial length of the blade assembly and generally between the primary lever and a point just above the spine of the wiper blade.

Windshield wipers, commonly referred to as "beam blades," are also known in the art and include a unitary backbone or "beam" with a wiper blade connected thereto. Examples of such "beam blade" type wiper assemblies are described in U.S. Pat. No. 5,325,564 issued Jul. 5, 1994 and U.S. Pat. No. 5,485,650 issued Jan. 23, 1996, both in the name of Swanepoel. This type of windshield wiper includes an single elongated, homogeneous strip forming a spring backbone or beam. The backbone has a connecting formation at a central position for connection to a reciprocating arm which applies a force and moves the backbone. The backbone is typically curved along a single plane which is the same plane of curvature of the windshield of the vehicle. The backbone of the wiper assembly is made from spring steel and tapers in width from its center towards its free ends or tips, along both longitudinal sides of the backbone. A wiper element is secured to the backbone and is centered along a centerline line at substantially equal distance to the longitudinal sides of the backbone. The thickness is also tapered from the center. Swanepoel teaches that the thickness and width of the backbone and its radius of curvature should be matched along the length of the backbone so that the backbone will provide a force per unit length distribution in a longitudinal direction which increases towards both tips of the windshield wiper when the windshield wiper is in use, pressed downward intermediate its ends onto a flat surface.

While beam blades enjoy lower profiles when compared with tournament style windshield wiper assemblies and therefore are not as prone to wind-lift, beam blade windshield wiper assemblies are not immune to this problem. In fact, airflow underneath the leading edge of the backbone which extends past the wiper blade can create a lift force greater than the opposing force created by the wiper assembly. The result is wiper blade wind lift at lower vehicle speeds.

While the windshield wiper assemblies known in the art provide significant advances in the related technology, there continues to be a need in the art for improvements in the windshield wiper systems which result in improved performance at variable vehicle speeds, and reduced wind lift with simplicity of parts and reduction in manufacturing costs.

SUMMARY OF THE INVENTION

The present invention overcomes the disadvantages of the related art in a beam blade windshield wiper assembly having an elongated backbone defining a median line extending along its longitudinal beam length between its first and second ends. The backbone includes an upper surface and a lower mounting surface as well as first and second sides extending between the upper and lower surfaces and the first and second longitudinal ends. The first side of the backbone defines a leading edge and the second side of the backbone defines a trailing edge. The assembly also includes a wiper element having a longitudinal centerline, said wiper element mounted to said backbone such that its longitudinal centerline is offset from said median line of said backbone in the direction of said leading edge.

One advantage of the present invention is that it provides a beam blade wiper assembly which has a low profile, is aesthetically pleasing and which has improved wind lift characteristics. More specifically, because the spine of the wiper element is mounted flush to the leading edge of the backbone, the lift force generated with respect to the beam blade windshield wiper assembly is reduced and thereby resists the effects of wind lift.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a plan view of the front of an automotive vehicle illustrating the beam blade wiper assembly of the present invention;

FIG. 2 is an enlarged plan view of the present invention;

FIG. 3 is a perspective view of the present invention;

DETAILED DESCRIPTION OF THE PREFERRED EMBODIMENT(S)

Figure 6:
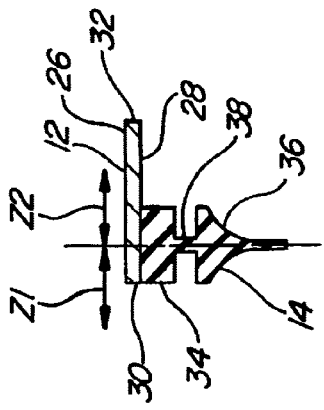
FIG. 6 is a cross sectional view of the present invention taken along lines 6—6 of FIG. 3.
Figure 5:
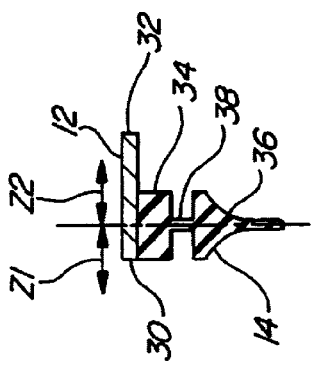
FIG. 5 is a cross sectional view of the present invention taken along lines 5—5 of FIG. 3.
Figure 4:
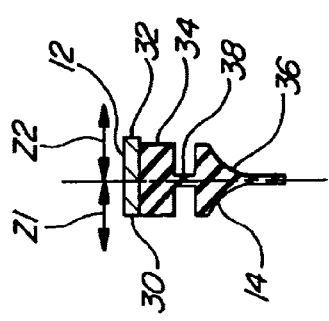
FIG. 4 is a cross sectional view of the present invention taken along lines 4—4 of FIG. 3.

Referring now to FIGS. 1–3, a beam blade wiper assembly of the present invention is generally indicated at 10 where like numbers are used to designate like structure throughout the drawings. The beam blade wiper assembly 10 includes a backbone 12 and a wiper element 14. As illustrated in FIG. 1, the beam blade wiper assembly 10 is controlled and driven by a spring loaded arm 16 (shown in phantom) mounted adjacent the windshield 11 of a vehicle and pivotally driven to impart reciprocating motion to the beam blade wiper assembly 10 across the windshield 11, as commonly known in the art. The backbone 12 has a centrally located connector schematically indicated at 18 for releasably connecting the wiper assembly 10 to the spring loaded wiper arm 16. The connector 18 can be of any suitable design. Preferably, the wiper element 14 is glued or otherwise adhered or bonded to the backbone 12. Alternatively, other structural interlocking methods may be used.

The elongated backbone 12 has a longitudinal beam length extending between first and second ends 20, 22. The beam length defines a median line 24 extending along the beam length. More specifically, the median line 24 is defined by a straight line extending between the midpoints of the first and second end 20, 22. The connector portion 18 is located at an intermediate position, commonly at the longitudinal center, between the first and second longitudinal ends 20, 22. The backbone 12 is of resiliently flexible material which applies a force from the spring loaded wiper arm 16 through the connecting portion 18 along the backbone's length to the first and second longitudinal ends 20, 22. The backbone 12 may take the form of a single, integral piece of material such that it defines a consolidated cross-section. Alternatively, the backbone 12 may be formed into a single piece by laminates.

The backbone 12 includes an upper surface 26 and an opposed, lower mounting surface 28 with first and second sides 30, 32 extending therebetween. As illustrated in these figures, the first side 30 is the leading edge of the backbone 12 while the second side 32 is the trailing edge of the backbone 12. In the preferred embodiment, the cross-section of the backbone 12 is generally rectangular making the first and second sides 30, 32 generally perpendicular to both the upper surface 26 and lower surface 28. However, those having ordinary skill in the art will appreciate that the cross-section may have any suitable geometric shape. The backbone 12 has a width defined along a width line W drawn between the first and second sides 30, 32 and perpendicular to the median line 24. In general, the backbone 12 varies in width W from the longitudinal center to the longitudinal ends 20, 22. In the preferred embodiment illustrated in the figures, a width line W1 dawn at the center will be greater than a width line W2 drawn at the ends 20, 22. Therefore, the width W is tapered from the general midpoint of the backbone to the first and second ends 20, 22. The thickness of the backbone 12 is defined by a line t extending perpendicular to the width between the upper surface 26 and mounting surface 28.

As best shown in FIGS. 3–6, the wiper element 14 has a spine 34, a tip portion 36 and a hinge 38 interconnecting the spine 34 and the tip 36. The tip portion 36 has a "delta" shape in cross-section and is the working end of the wiper element 14 which is operable for wiping action against a glass windshield surface. The hinge 38 allows the tip portion 36 to pivot slightly with respect to the glass surface of the windshield 11 thereby improving wipe quality. The arm 16 includes a biasing mechanism (not shown) such as a spring that creates a force which is distributed to the wiper element 14 through the backbone to clean the windshield. The wiper element 14 is mounted to the lower surface 28 of the backbone 12 and this may be accomplished in a number of different ways such as by mechanical mounting mechanisms, chemical mounting mechanisms, such as adhesives, or any other suitable mechanism known in the related art. Furthermore, while the wiper element 14 illustrated in the figures has the spine 34, the delta shaped tip portion 36 and the hinge 38, those having ordinary skill in the art will appreciate these components of the wiper element 14 may differ from that disclosed in the figures without departing from the scope of the invention.

The backbone 12 is curved longitudinally with a predetermined radius of curvature parallel to the plane of curvature of the windshield 11 (hereinafter "windshield curvature"). An x-y plane is defined by a cross section taken longitudinally along the median line 24 and through the backbone 12 and wiper element 14, with the x-axis extending tangentially to the median line 24 at the center of the backbone 12 and the y-axis extending through the cross-section of the backbone 12 and wiper element 14. The z-axis extends perpendicular to the x-y plane in the direction of the width line W drawn at the center or connecting portion 18. The curvature of the backbone 12 in the x-y plane may be symmetrical or asymmetrical depending on the force requirements and the contour of the windshield 11. The flexible, free form, pre-curved backbone 12 straightens out when the wiper arm 16 applies a force thereto to flatten the backbone 12 on a windshield 11. Thus, the backbone 12 must have adequate free-form curvature to ensure a good force distribution on windshields having various curvatures and to effect proper wrapping about the windshield 11. To this end, the disclosures of U.S. Pat. Nos. 5,325,564 and 5,485,650 issued to Swanepoel are incorporated herein by reference. The backbone 12 must also have high lateral stiffness to avoid chatter caused when a backbone's lateral deflection causes stick/slip behavior of the rubber wiper element 14 on the windshield 11. Lateral stiffness is provided mainly by the width of the backbone 12. Furthermore, the backbone 12 must have high torsional stiffness to avoid chatter due to torsional deflection. The torsional stiffness is provided mainly by the thickness of the backbone 12.

The present intention is characterized by the first side or leading edge 30 of the backbone 12 extending substantially parallel to the median line 24 between the first 20 and second 22 longitudinal ends. In the preferred embodiment, the second side or trailing edge 32 of the backbone 12 varies in its relationship to the median line 24. As illustrated in the figures, the second side 32 extends in non-parallel relation to the median line 24. In the preferred embodiment, the second side 32 is tapered from the connecting portion 18 toward the first and second ends 20, 22. Therefore, the width of the beam 12 varies at different locations between the first 20 and second 22 longitudinal ends as a result of the tapering geometry. Furthermore, a first distance Z1 is defined as the distance that the wiper element 14 is spaced from the first side 30 (see FIGS. 4–6). A second distance Z2 is defined as the distance that the wiper element 14 is spaced from the second side 32 of the beam 12. The first distance is less than the second distance to reduce or eliminate airflow beneath the backbone 12 and therefore air lift on the backbone 12 and wiper element 14. In the preferred embodiment, the first distance is constant and is half the width of the wiper element 14 and the second distance varies with the taper (see FIGS. 4–6). Therefore, by attaching the wiper element 14 adjacent or flush with the straight first side 30 or leading edge of the backbone 12, the backbone 12 is allowed to extend past the rubber wiper element 14 only along the second edge 32 or trailing edge of the backbone 12. Therefore, the beam area along the first or leading edge 30 is reduced or eliminated to improve wind lift characteristics.

In support of the present invention, computer simulations were conducted comparing the prior art beam blade configuration utilizing a wiper element located along the median line of the backbone and between the first and second sides of the backbone to the beam blade assembly 10 of the present invention. The tests revealed that the lift force in the present beam blade assembly 10 is significantly lower than in the prior art design. The following equation was utilized to calculate the lift coefficient:

$$F_{lift} = C_{lift} \tfrac{1}{2} \rho V^2 s^2$$

where: $F_{lift}$=lift force (output from software)
$C_{lift}$=airfoil efficiency factor
$\rho$=air density (function of temperature and pressure)
V=velocity
s=cross sectional area (normal to lift force)
Since all variable except $F_{lift}$ are constants, the equation is simplified as:

$$F_{lift} = C_{lift} V^2$$

Figure 7:
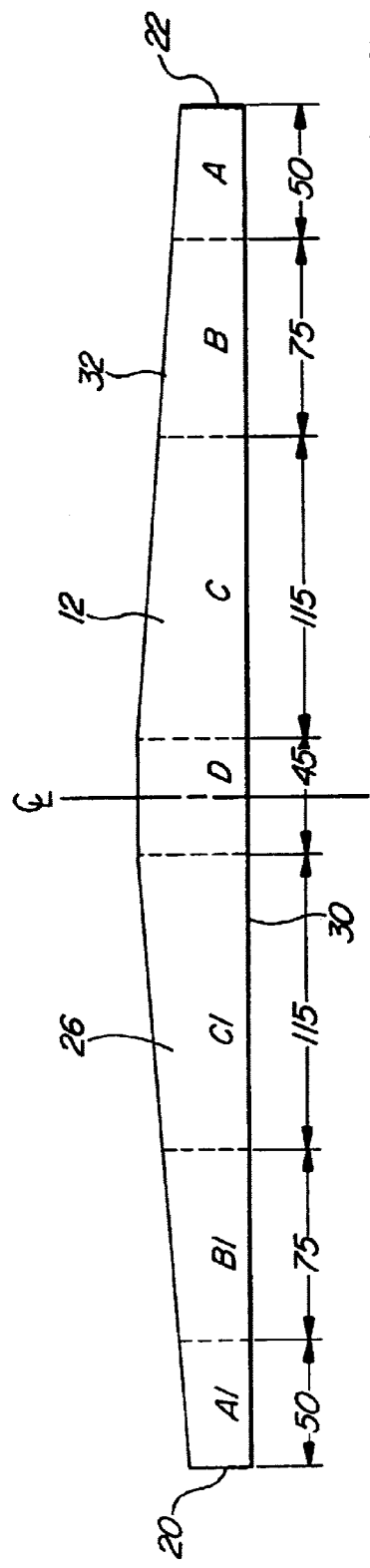
FIG. 7 is an enlarged schematic plan view illustrating beam sections which correspond to the total lift forces set forth in Table 1.

The computer simulations were employed to determine and compute the lifting force acting on both the beam blade of the prior art as well as the beam blade of the present invention at a vehicle velocity of 120 mph. The results of the simulations are set forth in Table 1. The designations for the beam sections are taken with reference to FIG. 7.

The following results were determined.

TABLE 1

| Beam Section | Section Length (mm) | Prior Art Total Lift Force (N) | Present Invention Total Lift Force (N) |
|---|---|---|---|
| A + A$_1$ | 100 | 1.480 | 1.480 |
| B + B$_1$ | 150 | 2.940 | 2.610 |
| C + C$_1$ | 230 | 5.451 | 4.002 |
| D | 45 | 1.184 | 0.783 |
| TOTALS | 525 | 11.05 | 8.875 |

The results indicate that the total lift force acting on the windshield wiper assembly of the present invention is reduced as compared with that of the prior art. Accordingly, the beam blade windshield wiper assembly of the present invention provides a low profile, is aesthetically pleasing and has improved wind lift characteristics. More specifically, the spine of the wiper element is mounted substantially flush to the leading edge of the backbone, the lift force generated with respect to the beam blade windshield wiper assembly is reduced and thereby resists the effects of wind lift.

The invention has been described in an illustrative manner. It is to be understood that the terminology which has been used is intended to be in the nature of words of description rather than of limitation. Many modifications and variations oft he invention are possible in light of the above teachings. Therefore, within the scope of the appended claims, the invention may be practiced other than as specifically described.

We claim:

1. A beam blade windshield wiper assembly comprising:
an elongated backbone defining a median line extending along its longitudinal beam length between first and second longitudinal ends, an upper surface, a lower mounting surface and first and second sides extending between said upper and lower surface as well as said first and second longitudinal ends, said first side defining a leading edge of said backbone and said second side defining a trailing edge of said backbone, said first side extending parallel to said median line and said second side extending in non-parallel relationship with respect to said median line; and
a wiper element having a longitudinal centerline, said wiper element mounted to said backbone such that its longitudinal centerline is offset from said median line of said backbone in the direction of said leading edge.

2. A beam blade windshield wiper assembly as set forth in claim 1 wherein said wiper element includes a spine and a tip portion, said spine disposed flush with said leading edge of said backbone along said longitudinal beam length.

3. A beam blade windshield wiper assembly as set forth in claim 1 wherein said backbone defines a width between said first side and said second side, said width being varied at different locations between said first and second longitudinal ends.

4. A beam blade windshield wiper assembly as set forth in claim 1 wherein said backbone includes a connecting portion disposed intermediate said first and second ends, said second side being tapered from said connecting portion toward said first and second longitudinal ends.

5. A beam blade windshield wiper assembly as set forth in claim 4 wherein said connecting portion is located at a longitudinal center of said backbone.

6. A beam blade windshield wiper assembly as set forth in claim 1 wherein said backbone is comprised of a homogeneous integral member.

7. A beam blade windshield wiper assembly as set forth in claim 1 wherein said backbone has a consolidated cross-section.

8. A beam blade windshield wiper assembly comprising:
an elongated backbone having a longitudinal beam length extending between first and a second longitudinal ends and defining a median line extending along said beam length, said backbone having a connecting portion at an intermediate position between said first and second longitudinal ends and being of a resiliently flexible material to apply a force from the connecting portion along the length to said first and second longitudinal ends, said backbone including an upper surface and an opposed lower mounting surface with first and second sides extending therebetween, said first side extending parallel to said median line and said second side extending in non-parallel relationship to said median line;
a wiper element attached to said backbone at said lower mounting surface at a first distance from said first side and a second distance from said second side; and
said first distance being less than said second distance at a longitudinal center portion of said backbone.

9. A beam blade windshield wiper assembly as set forth in claim 8 wherein said wiper element is attached to said backbone such that said first distance is less than said second distance at all positions longitudinally along said backbone.

10. A beam blade windshield wiper assembly as set forth in claim 8 wherein said backbone has a width extending between said first side and said second side, said width varying at different locations between said first and second longitudinal ends.

11. A beam blade windshield wiper assembly as set forth in claim 8 wherein said second side is tapered from the intermediate position of said backbone.

12. A beam blade windshield wiper assembly as set forth in claim 8 wherein said backbone is comprised of a homogeneous integral member.

13. A beam blade windshield wiper assembly as set forth in claim 8 wherein said backbone is substantially coextensive with said wiper blade.

* * * * *